United States Patent
Simmons

(10) Patent No.: US 8,225,549 B2
(45) Date of Patent: Jul. 24, 2012

(54) APPARATUS FOR AEROPONICALLY GROWING AND DEVELOPING PLANTS

(76) Inventor: Robert Scott Simmons, Indiantown, FL (US)

( * ) Notice: Subject to any disclaimer, the term of this patent is extended or adjusted under 35 U.S.C. 154(b) by 293 days.

(21) Appl. No.: 12/584,773

(22) Filed: Sep. 11, 2009

(65) Prior Publication Data

US 2011/0061296 A1    Mar. 17, 2011

(51) Int. Cl.
  *A01G 31/02* (2006.01)
(52) U.S. Cl. .................................................. 47/62 N
(58) Field of Classification Search .............. 47/59 R, 47/60, 62 A, 62 N, 62 R, 79, 82, 83, 86, 87
  See application file for complete search history.

(56) References Cited

U.S. PATENT DOCUMENTS

| | | | |
|---|---|---|---|
| 4,332,105 A | 6/1982 | Nir | |
| 4,514,930 A | 5/1985 | Schorr et al. | |
| 4,574,520 A * | 3/1986 | Arledge | 47/59 R |
| 4,669,217 A | 6/1987 | Fraze | |
| 4,704,818 A | 11/1987 | Cameron | |
| 4,813,176 A | 3/1989 | Takayasu | |
| 4,825,592 A * | 5/1989 | Earls | 47/82 |
| 4,869,019 A | 9/1989 | Ehrlich | |
| 4,986,027 A | 1/1991 | Harvey | |
| 5,136,804 A | 8/1992 | Rothem et al. | |
| 5,363,594 A * | 11/1994 | Davis | 47/82 |
| 5,381,625 A * | 1/1995 | Wente | 47/83 |
| 5,393,426 A | 2/1995 | Raskin et al. | |
| 5,501,037 A | 3/1996 | Aldokimov et al. | |
| 5,555,676 A * | 9/1996 | Lund | 47/82 |
| 5,724,768 A | 3/1998 | Ammann, Jr. | |
| 5,876,484 A | 3/1999 | Raskin et al. | |
| 5,918,416 A * | 7/1999 | Ammann, Jr. | 47/82 |
| 6,000,173 A | 12/1999 | Schow et al. | |
| 6,021,602 A | 2/2000 | Orsi | |
| 6,408,570 B1 * | 6/2002 | Shih et al. | 47/79 |
| 6,807,770 B2 | 10/2004 | Wainwright et al. | |
| 7,823,328 B2 | 11/2010 | Walhovd | |
| 7,913,452 B1 * | 3/2011 | Imm | 47/83 |
| 2005/0198897 A1 | 9/2005 | Wainright et al. | |
| 2005/0252080 A1 | 11/2005 | Wright | |
| 2006/0053691 A1 | 3/2006 | Harwood et al. | |
| 2006/0156624 A1 | 7/2006 | Roy et al. | |

(Continued)

OTHER PUBLICATIONS

Ziegler, Reinhold, The Vertical Aeroponic Growing System. pp. 1-13.

(Continued)

*Primary Examiner* — Frank T Palo
(74) *Attorney, Agent, or Firm* — Steven M. Greenberg, Esq.; Carey Rodriguez Greenberg & O'Keefe, LLP

(57) ABSTRACT

A self-contained apparatus for aeroponically growing and developing plants that comprises a reservoir for containing a liquid nutrient solution, a conical tower, a power supply, and a pump to move the liquid nutrient solution through the apparatus. The apparatus utilizes a pump to move the liquid nutrient solution from the reservoir vertically to a distribution pipe. Gravity then pulls the liquid nutrient solution downward through the distribution pipe, which is sealed at the opposite end. The pressure created within the distribution pipe creates sufficient force to disperse the liquid nutrient solution through the opening(s) in the distribution pipe onto the exposed root mass. Once the nutrient solution has been dispersed into the conical tower it is absorbed by the exposed root mass. The un-absorbed liquid nutrient solution collects the in base of the conical tower and is returned to the reservoir to be reused.

7 Claims, 3 Drawing Sheets

U.S. PATENT DOCUMENTS

2006/0162252 A1* 7/2006 Lim .............................. 47/59 R
2006/0272210 A1 12/2006 Bissonnette et al.
2007/0113472 A1 5/2007 Plowman
2011/0061296 A1* 3/2011 Simmons ..................... 47/62 A

OTHER PUBLICATIONS

International Search Report and Written Opinion of the International Searching Authority in International Application No. PCT/US2010/048386, mailed Nov. 15, 2010.

\* cited by examiner

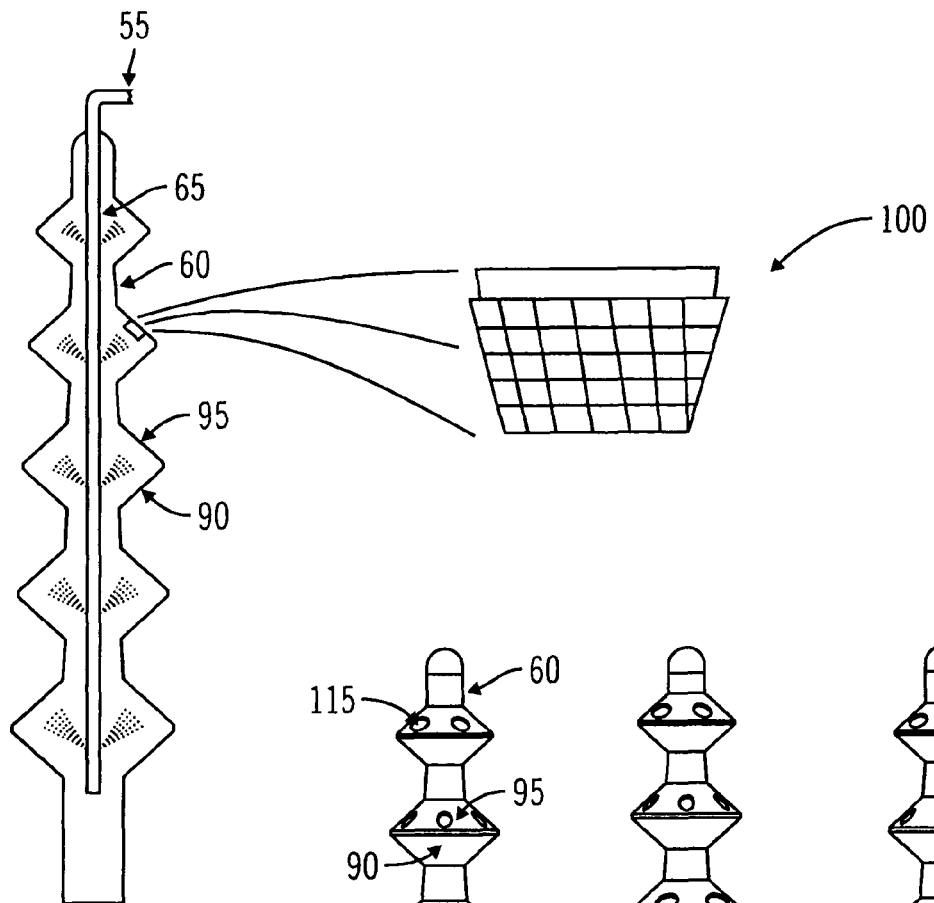
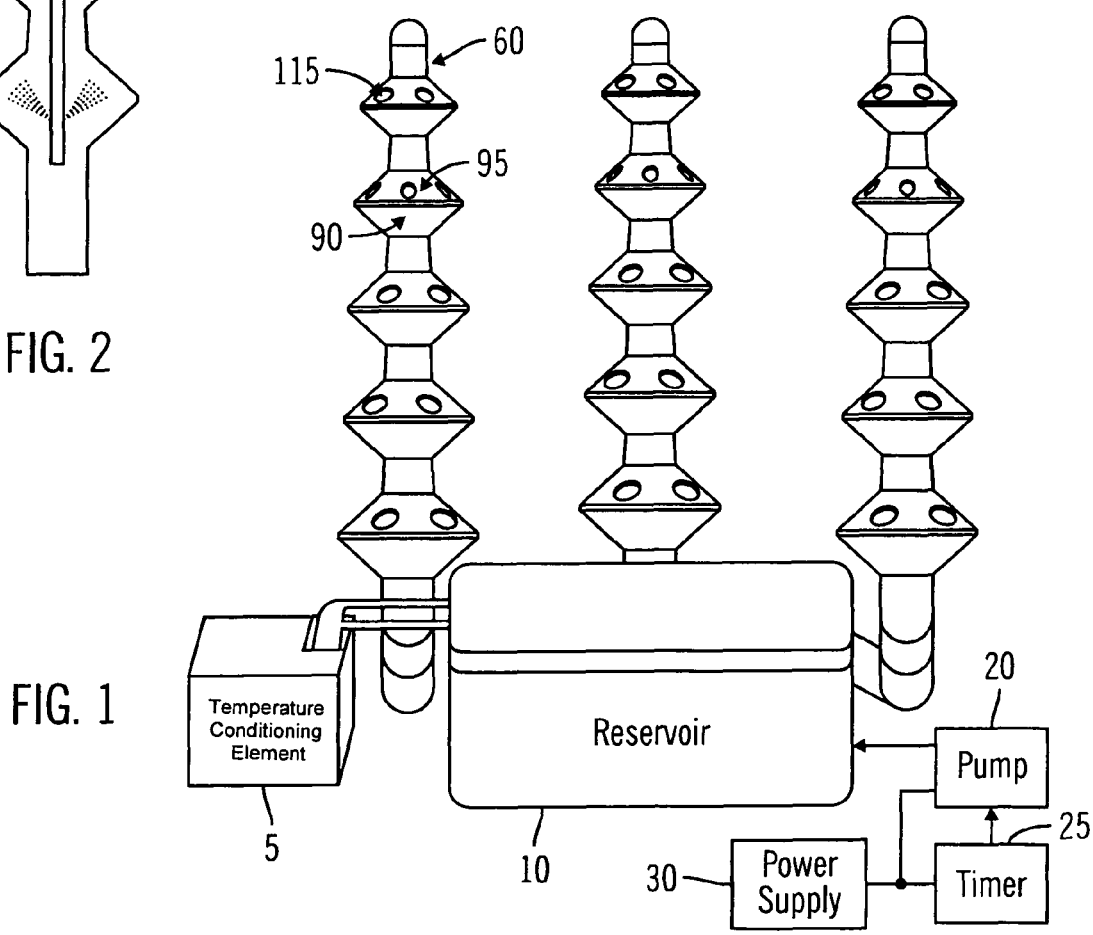
FIG. 2
FIG. 1

APPARATUS FOR AEROPONICALLY GROWING AND DEVELOPING PLANTS

FIELD OF THE INVENTION

The present invention relates to aeroponics and the growth and development of plants in a gaseous environment into which a liquid nutrient solution is introduced.

BACKGROUND OF THE INVENTION

Prior to the expansion of aeroponic devices for the growth and development of plants, people experimented with hydroponics, which is a method of growing plants using mineral nutrient liquid solutions instead of soil. Hydroponics is said to provide healthier plants that grow faster than those grown in soil. Although in hydroponics plants are grown in the absence of soil, the roots are maintained in a liquid environment. Consequently, one of the reasons hydroponics is not widely accepted is because the lack of adequate ventilation at the roots from the continuous presence of water is a major cause of root disease.

To solve this problem, people turned to aeroponics. As generally known, aeroponics is the process of growing plants in an air or mist environment without the use of soil or an aggregate medium. One of the reasons why aeroponics has been in such high demand is because of the proliferation of disease, such as *Fussarium, Boytrytis, Sclerotium, Verticilium* and *Rhizoctonia*, among plants that are cultivated in soil and through hydroponics. Other difficulties that arise in cultivating plants grown in soil are the demand for specialized nutrients to enhance growth, and, more importantly, the need for land.

Therefore what is needed is an apparatus that more efficiently and effectively executes aeroponic principals in a given volume.

The present invention will be more fully understood and appreciated from the following detailed description taken in conjunction with the drawings.

BRIEF DESCRIPTION OF THE DRAWINGS

FIG. 1 illustrates a commercial aeroponic growth and development system.

FIG. 2 illustrates an aeroponic growing tower.

DETAILED DESCRIPTION OF A PREFERRED EMBODIMENT

Figure 3:
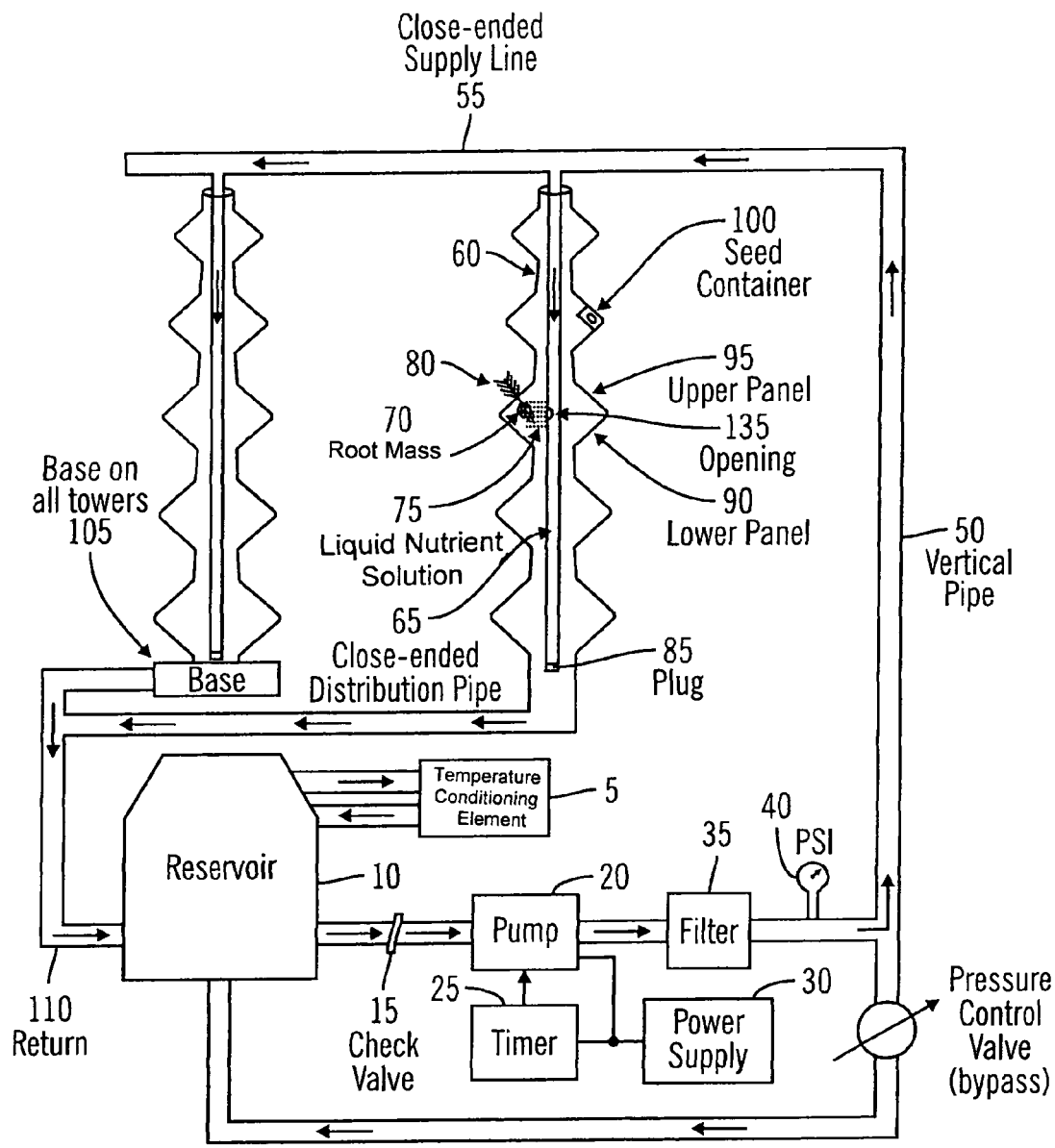
FIG. 3 is a schematic diagram showing operation of the aeroponic system.

Nir, U.S. Pat. No. 4,332,105 discusses a method and an apparatus for aeroponically growing and developing multiple plants in which the plants are supported by a perforated plant support member adapted to secure plants above the root portions and expose the root portions to the atmosphere. A problem with Nir's invention as illustrated in U.S. Pat. No. 4,332,105 is that the growth and development units are rectangular and comprise a support frame having legs and a peripheral supporting structure mounted thereon. Therefore, the number of plants that can be cultivated is limited by the amount of land on which to put the horizontal development units. Additionally, if one attempts to stack the rectangular units to increase the amount of plants cultivated within a defined space, the amount of light received by the lower development units will be limited by the development units stacked on top, thereby negatively impacting the growth of the plants. However, the instant invention does not utilize rectangular plant development units. As will be appreciated from Applicant's invention, the conical shape of the tower and the offset spacing of the plants allows for a greater variety of plants, including longer living plants and those with a larger root mass to be grown at the same time. Similarly, the off-set spacing allows for the use of different size panels with openings that can be adopted to difference size plants. Moreover, the use of gravity allows the present invention to be used to grow a greater number of plants in a more cost effective, energy efficient, and environmentally friendly manner by not requiring expensive high pressure pumps to mist the exposed root mass of the plants.

Schorr et. al., U.S. Pat. No. 4,514,930 discusses the use of an intermittent nutrient delivery system, namely an apparatus and a method for the propagation of plants in an aeroponic environment through the use of an aqueous plant growth nutrient and hormone composition that is applied as an intermittent hydro-atomized mist to plant cuttings suspended in an enclosed chamber. One disadvantage of the invention as illustrated in U.S. Pat. No. 4,514,930 is the need for a supply of tap water at standard or common tap pressure to create the necessary suction to draw the measured amount of nutrient, hormone or other solution from different containers to cultivate the plants. Said nutrients, hormones, and plant growth promoting compositions are housed in separate containers connected by appropriate conduits with check valves. Therefore, without the suction created by the tap water pressure the plants would not receive the required nutrients. Further, after a measured length of time, the flow of tap water is shut off and the system is drained. The instant invention, however, does not require constant water pressure from a standard tap source to introduce and mix the nutrient solution, since Applicant's apparatus is a self contained system. Further, as will be appreciated in Applicant's invention, the apparatus does not have to be drained after each cycle. Instead the liquid nutrient solution utilized in Applicant's invention collects in the base and is returned to the reservoir to be reused.

Ehrlich, U.S. Pat. No. 4,869,019, discusses the use of a self contained aeroponic system comprising a reservoir for containing a nutrient solution. U.S. Pat. No. 4,869,019 illustrates a self-contained aeroponic apparatus in which the plant support is right-angular in vertical cross-section, including a vertical back wall and a hypotenuse front wall having the tubular cups. With this system, the nutrient solution must be propelled upward through the pipes to the horizontal pipes in order for it to reach the spraying wands. The fact the pump must propel the nutrient solution upward posses a significant limitation on the height of the apparatus and the number of plants that can be grown at one time. This feature poses a problem since the height of the apparatus, and thereby the number of plants that can be grown, is directly related to the power of the pump. The weaker the pump the shorter the vertical pipes and the fewer plants can be grown. However, since Applicant's invention utilizes gravity to create the pressure necessary to mist, fog, or spray the exposed root mass, it does not require expensive high pressure pumps.

FIG. 1 illustrates a commercial aeroponic growth and development system, which comprises a reservoir 10, a pump 20, a timer 25, a power supply 30, and a conical tower 60 comprising a first end and second end, wherein the first end is atmospherically sealed and the second end is coupled to the reservoir 10.

Referring to FIG. 2, the conical tower 60 contains an upper portion that is atmospherically sealed through which the distribution pipe 65 extends through the middle of the conical tower 60. Other than the opening in the upper portion for the distribution pipe 65, the upper portion is atmospherically sealed to prevent any unnecessary evaporation or seepage of liquid nutrient solution, as referred to in FIG. 3 (75). In addition to having a sealed upper portion through which the distribution pipe 65 is located, the conical tower 60 has at least one panel 95 extending outward and downward containing at least one opening adapted to retain a seed container 100. Connecting this downward and outward sloping panel 95 to the conical tower 60 is another panel 90 extending downward and inward from the end of the outward sloping panel 95, forming a triangle. The panels extending downward and outward 95 connecting those extending downward and inward 90 run circumferentially around the conical tower 60 as seen on FIG. 1.

Referring back to FIG. 1, in the preferred embodiment of the invention, the upper panel 95 of the triangular structure slopes outward and downward and the panel 90 connecting the upper panel 95 to the conical tower 60 slopes inward and downward. The upper panel 95 contains at least one opening 115 at circumferentially spaced points around the conical tower 60 adapted to retain the seed container, as referred to in FIG. 2 (100), for supporting a plant, seed, or starter media. The seed container, as referred to in FIG. 2 (100) comprises holes, a mesh, a basket, or the like, which maintains the plant, seed, or starter media.

Figure 4:
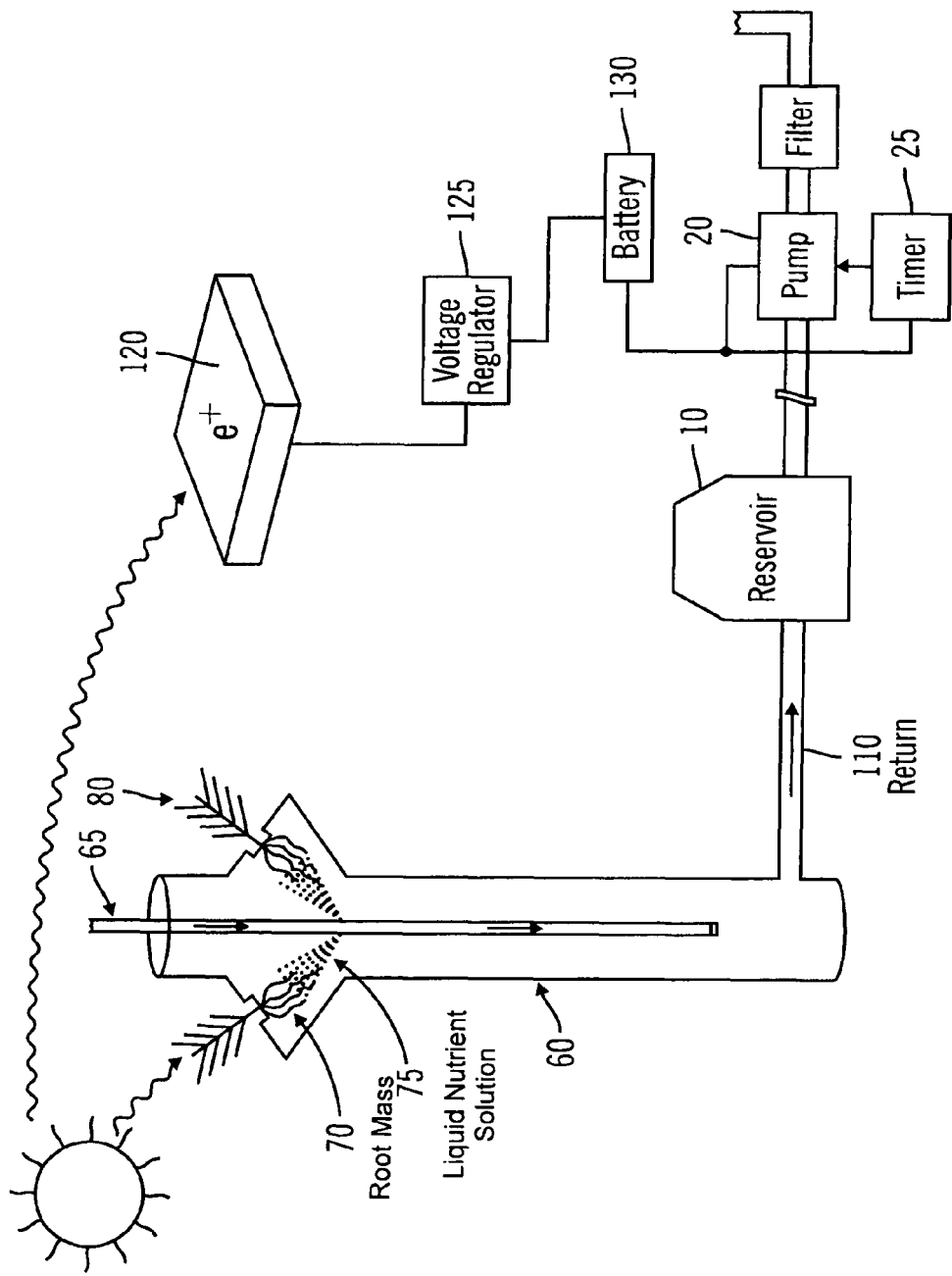
FIG. 4 is a schematic representation of a growing tower.

Referring to FIG. 3, the present aeroponic apparatus utilizes a timer 25, which controls the pump 20. The pump 20 provides for the delivery of the liquid nutrient solution 75 used in the present aeroponic system. The power supply 30 utilized to power the aeroponic system can be an alternating current (AC) system of 120 volts alternating current (VAC) or a direct current (DC) system of 12 volts direct current (VDC). Referring to FIG. 4, the alternating or direct current can be derived from solar energy or wind power. To be adapted to work with alternative forms of energy such as solar power, a solar panel 120, a voltage regulator 125, and the battery 130 should be utilized to provide the necessary energy for the pump 20 and the timer 25. As used herein, the term "liquid nutrient solution" refers to a liquid which contains nutrients in the solution or in the mixture. Referring to FIG. 3, while there are various intervals at which to set the timer 25, the preferred interval is one (1) minute on and five (5) minutes off. According to an alternative embodiment of the invention, the temperature of the nutrient solution can be maintained through the use of a temperature conditioning element 5, which can be separate and apart from the reservoir 10, such as a chiller or a heater coupled to the power supply 30, or can be located within the reservoir 10, such as an ice-pack. The pH levels, temperature and the nutrients contained in the solution can be controlled inside the reservoir with a digital meter.

The pump 20, coupled to the reservoir 10, pushes the liquid nutrient solution 75 upward through a vertical pipe 50. As will be appreciated, in an alternative embodiment, the pipe coupling the vertical pipe to the reservoir may contain a filter 35, to remove the impurities in the liquid nutrient solution 75 and/or a check valve 15 to prevent the liquid nutrient solution 75 from flowing back into the reservoir 10. The pipe may also contain a pressure gauge 40. In accordance with the preferred embodiment of the invention, the liquid nutrient solution 75 is propelled upward through the vertical pipe 50, which may range from one (1) inches to three (3) inches in diameter or more. The use of a pipe with such a small diameter makes the apparatus more efficient by requiring less energy to propel the liquid nutrient solution 75 upward from the reservoir 10 to the distribution pipe(s) 65. The liquid nutrient solution 75 is dispersed into the conical tower(s) 60 via the use of a close-ended supply line 55, which is coupled to at least one close ended distribution pipe 65, which can be at least half (½) an inch in diameter and runs downward through the middle of the conical tower 60. The close-ended distribution pipe 65 running downward through the middle of the conical tower 60 is sealed 85 at the opposite end and contains at least one opening per plant on its side 135 through which the liquid nutrient solution can be misted, fogged, or sprayed 75. The un-absorbed liquid nutrient solution is then collected in the base 105 flows through the return 110 to the reservoir 10 to be reused.

Referring again to FIG. 3, in operation, the liquid nutrient solution is propelled upward through the vertical pipe 50 from the reservoir 10 by the pump 20. Once the liquid nutrient solution is transported propelled upward through the vertical pipe 50 to the closed ended supply line 55, gravity pulls the liquid nutrient solution downward through the close-ended distribution pipe 65. Since the distribution pipe 65 is sealed at the opposite end 85, the distribution pipe 65 fills with liquid nutrient solution. As the distribution pipe 65 fills with liquid nutrient solution, the pressure created from the downward flowing liquid nutrient solution causes the liquid nutrient solution to be expelled from the distribution pipe 65 via the opening(s) 135 in the distribution pipe 65. The pressure created from the incoming liquid nutrient solution 75 into the distribution pipe 65 is sufficient to create a mist, fog, or spray of liquid nutrient solution 75 within the conical tower 60.

Referring to FIG. 4, the seed container, as referred to in FIG. 2 (100), exposes the root mass 70 of the plant to the liquid nutrient solution 75 dispersed from the distribution pipe 65 and the atmosphere contained within the conical tower 60. The upper portion of the plant 80 is exposed to light, which can be artificial or natural. The triangular structure is intended to act as a drain for the liquid nutrient solution, which is not absorbed by the exposed root mass 70. The un-absorbed liquid nutrient solution is then accumulated in the base, as referred to in FIG. 3 (105), coupled to the conical tower 60 and passes through the return 110 to the reservoir 10 to permit recycling and reuse of the un-absorbed liquid nutrient solution.

Since it is the downward flow of the liquid nutrient solution 75 is that creates the necessary pressure to mist, fog, or spray the exposed root mass 70, a more energy efficient pump is used to mist a greater number of plants. Due to the three dimensional agricultural growing space that is created through the implementation of the present invention, the number and variety of plants that can be grown using relatively little energy is virtually unlimited. This allows the present invention to be more energy efficient, cost effective, and environmentally friendly.

What is claimed is:
1. An apparatus comprising:
a reservoir;
a pump coupled to the reservoir;
a power supply coupled to the pump; and
a conical tower coupled to the reservoir, the conical tower comprising: a first and a second end, wherein the first end includes a liquid nutrient solution and the second end is coupled to the reservoir, the conical tower comprising a surface area having at least one opening adapted to retain a seed container.
2. The apparatus according to claim 1, wherein the first end is atmospherically sealed.

3. The apparatus according to claim 1, wherein a timer is coupled to the pump.

4. The apparatus according to claim 1, wherein the conical tower further comprises:
   at least one first panel extending outward and downward;
   at least one opening in the first panel; and,
   at least one second panel extending downward and inward coupled to the first panel.

5. The apparatus according to claim 4, wherein the seed container is adapted to fit into the at least one opening in the first panel.

6. The apparatus according to claim 1, wherein at least one second conical tower is coupled to the conical tower.

7. An apparatus comprising:
   a reservoir;
   a temperature conditioning element coupled to the reservoir;
   a pump coupled to the reservoir;
   a filter coupled to the pump;
   a timer coupled to the pump;
   a power source coupled to the pump and the timer;
   a pipe coupled to the reservoir; and
   a conical tower coupled to the reservoir, the conical tower comprising: a first and a second end, wherein said first end is closed to the atmosphere and the second end is coupled to the reservoir, the conical tower comprising a surface area having at least one opening adapted to retain a seed container, the first end includes a nutrient feed.

\* \* \* \* \*